United States Patent
Shveidel et al.

(10) Patent No.: US 11,237,771 B1
(45) Date of Patent: Feb. 1, 2022

(54) TRANSACTIONAL UPDATE SYSTEM AND METHOD

(71) Applicant: EMC IP Holding Company, LLC, Hopkinton, MA (US)

(72) Inventors: Vladimir Shveidel, Pardes-Hana (IL); Bar David, Rishon Lezion (IL)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

(21) Appl. No.: 17/074,840

(22) Filed: Oct. 20, 2020

(51) Int. Cl.
*G06F 3/06* (2006.01)
*G06F 9/46* (2006.01)

(52) U.S. Cl.
CPC .......... *G06F 3/0659* (2013.01); *G06F 3/0604* (2013.01); *G06F 3/065* (2013.01); *G06F 3/0629* (2013.01); *G06F 3/0653* (2013.01); *G06F 3/0683* (2013.01); *G06F 9/467* (2013.01)

(58) Field of Classification Search
None
See application file for complete search history.

(56) References Cited

U.S. PATENT DOCUMENTS

| | | | | |
|---|---|---|---|---|
| 10,152,422 | B1* | 12/2018 | Sampathkumar ... | G06F 12/0882 |
| 11,068,299 | B1* | 7/2021 | Armangau ......... | G06F 9/30087 |
| 2017/0046099 | A1* | 2/2017 | DeJong ............... | G06F 3/0619 |
| 2017/0286238 | A1* | 10/2017 | Kesavan ............. | G06F 11/1662 |
| 2021/0019257 | A1* | 1/2021 | Shu .................... | G06F 16/2255 |

* cited by examiner

*Primary Examiner* — Ryan Bertram
*Assistant Examiner* — Edmund H Kwong
(74) *Attorney, Agent, or Firm* — Brian J. Colandreo; Mark H. Whittenberger; Holland & Knight LLP (57) ABSTRACT

A method, computer program product, and computing system for receiving a plurality of updates to one or more metadata pages of a storage system, where the plurality of updates include one or more bulk updates and one or more delta updates. A transaction record may be defined. The delta updates may be written to a non-volatile log. The bulk updates may be written to a first metadata store position. The bulk updates may be written to a second metadata store position in response to writing the bulk updates to the first metadata store position. A status indicator for the transaction record may be set based upon, at least in part, writing the delta updates to the non-volatile log and one or more of writing the bulk updates to the first metadata store position and writing the bulk updates to the second metadata store position.

20 Claims, 7 Drawing Sheets

TRANSACTIONAL UPDATE SYSTEM AND METHOD

BACKGROUND

Storing and safeguarding electronic content may be beneficial in modern business and elsewhere. Accordingly, various methodologies may be employed to protect and distribute such electronic content.

Updates to metadata pages of a storage system may include delta updates (i.e., changes to a specific portion or area of a metadata page) and bulk updates (i.e., changes to the entire metadata page). In some implementations, it may be beneficial to process these types of updates separately (e.g., to increase metadata page amortization). Further, the updates of each type (i.e., delta or bulk) must be preserved such that the updates can be recovered in the event of a storage system failure.

However, conventional approaches for processing these types of changes require persisting the bulk updates to large transactional areas in non-volatile random access memory (e.g., NVRAM). Accordingly, these conventional approaches reduce overall system performance. For example, conventional approaches waste NVRAM bandwidth, that is a bottleneck in many scenarios, and waste CPU and other resources for additional processing of bulk updates to the large transactional areas in NVRAM to journal the bulk updates. Further, these conventional approaches increase metadata commit latency with the processing of bulk updates on a transactional journal of NVRAM and introduce additional waiting for NVRAM write completion and scheduling cycles. Additionally, the large transactional areas in NVRAM waste expensive NVRAM space within a storage system.

SUMMARY OF DISCLOSURE

In one example implementation, a computer-implemented method executed on a computing device may include, but is not limited to, receiving a plurality of updates to one or more metadata pages of a storage system, wherein the plurality of updates include one or more bulk updates and one or more delta updates to the one or more metadata pages. A transaction record for the plurality of updates to the one or more metadata pages may be defined. The one or more delta updates may be written to a non-volatile log. The one or more bulk updates of the plurality of updates may be written to the one or more metadata pages of a first metadata store position. The one or more bulk updates of the plurality of updates may be written to the one or more metadata pages of a second metadata store position in response to writing the one or more bulk updates of the plurality of updates to the one or more metadata pages of the first metadata store position. A status indicator for the transaction record for the plurality of updates may be set based upon, at least in part, writing the one or more delta updates to the non-volatile log and one or more of writing the one or more bulk updates of the plurality of updates to the one or more metadata pages of the first metadata store position and writing the one or more bulk updates of the plurality of updates to the one or more metadata pages of the second metadata store position.

One or more of the following example features may be included. Each of the first metadata store position and the second metadata store position are storage devices configured to mirror each other. Defining the transaction record for the plurality of updates to the one or more metadata pages may include writing the transaction record to the non-volatile log. Setting the status indicator for the transaction record for the plurality of updates may include setting the status indicator to a first status indicator indicating that the one or more bulk updates of the plurality of updates are being written to the one or more metadata pages of the first metadata store position and written to the one or more metadata pages of the second metadata store position. A failure associated with the storage system may be identified. It may be determined that the status indicator for the transaction record for the plurality of updates is the first status indicator. It may be determined whether each metadata page of the one or more metadata pages of the first metadata store position may include a reference to the transaction record. In response to determining that each metadata page of the one or more metadata pages of the first metadata store may include a reference to the transaction record, each metadata page of the one or more metadata pages may be copied from the first metadata store position to the second metadata store position. The status indicator for the transaction record for the plurality of updates may be set to a second status indicator indicating that the one or more bulk updates of the plurality of updates are written to the second metadata store position. In response to determining that each metadata page of the one or more metadata pages of the first metadata store does not include a reference to the transaction record, each metadata page of the one or more metadata pages may be copied from the second metadata store position to the first metadata store position. The transaction record for the plurality of updates may be invalidated.

In another example implementation, a computer program product resides on a computer readable medium that has a plurality of instructions stored on it. When executed by a processor, the instructions cause the processor to perform operations that may include, but are not limited to, receiving a plurality of updates to one or more metadata pages of a storage system, wherein the plurality of updates include one or more bulk updates and one or more delta updates to the one or more metadata pages. A transaction record for the plurality of updates to the one or more metadata pages may be defined. The one or more delta updates may be written to a non-volatile log. The one or more bulk updates of the plurality of updates may be written to the one or more metadata pages of a first metadata store position. The one or more bulk updates of the plurality of updates may be written to the one or more metadata pages of a second metadata store position in response to writing the one or more bulk updates of the plurality of updates to the one or more metadata pages of the first metadata store position. A status indicator for the transaction record for the plurality of updates may be set based upon, at least in part, writing the one or more delta updates to the non-volatile log and one or more of writing the one or more bulk updates of the plurality of updates to the one or more metadata pages of the first metadata store position and writing the one or more bulk updates of the plurality of updates to the one or more metadata pages of the second metadata store position.

One or more of the following example features may be included. Each of the first metadata store position and the second metadata store position are storage devices configured to mirror each other. Defining the transaction record for the plurality of updates to the one or more metadata pages may include writing the transaction record to the non-volatile log. Setting the status indicator for the transaction record for the plurality of updates may include setting the status indicator to a first status indicator indicating that the one or more bulk updates of the plurality of updates are being written to the one or more metadata pages of the first metadata store position and written to the one or more metadata pages of the second metadata store position. A failure associated with the storage system may be identified. It may be determined that the status indicator for the transaction record for the plurality of updates is the first status indicator. It may be determined whether each metadata page of the one or more metadata pages of the first metadata store position may include a reference to the transaction record. In response to determining that each metadata page of the one or more metadata pages of the first metadata store may include a reference to the transaction record, each metadata page of the one or more metadata pages may be copied from the first metadata store position to the second metadata store position. The status indicator for the transaction record for the plurality of updates may be set to a second status indicator indicating that the one or more bulk updates of the plurality of updates are written to the second metadata store position. In response to determining that each metadata page of the one or more metadata pages of the first metadata store does not include a reference to the transaction record, each metadata page of the one or more metadata pages may be copied from the second metadata store position to the first metadata store position. The transaction record for the plurality of updates may be invalidated.

In another example implementation, a computing system includes at least one processor and at least one memory architecture coupled with the at least one processor, wherein the at least one processor is configured to receive a plurality of updates to one or more metadata pages of a storage system, wherein the plurality of updates include one or more bulk updates and one or more delta updates to the one or more metadata pages, wherein the at least one processor may be further configured to define a transaction record for the plurality of updates to the one or more metadata pages, wherein the at least one processor may be further configured to write the one or more delta updates to a non-volatile log, wherein the at least one processor may be further configured to write the one or more bulk updates of the plurality of updates to the one or more metadata pages of a first metadata store position, wherein the at least one processor may be further configured to write the one or more bulk updates of the plurality of updates to the one or more metadata pages of a second metadata store position in response to writing the one or more bulk updates of the plurality of updates to the one or more metadata pages of the first metadata store position, and wherein the at least one processor may be further configured to set a status indicator for the transaction record for the plurality of updates based upon, at least in part, writing the one or more delta updates to the non-volatile log and one or more of writing the one or more bulk updates of the plurality of updates to the one or more metadata pages of the first metadata store position and writing the one or more bulk updates of the plurality of updates to the one or more metadata pages of the second metadata store position.

One or more of the following example features may be included. Each of the first metadata store position and the second metadata store position are storage devices configured to mirror each other. Defining the transaction record for the plurality of updates to the one or more metadata pages may include writing the transaction record to the non-volatile log. Setting the status indicator for the transaction record for the plurality of updates may include setting the status indicator to a first status indicator indicating that the one or more bulk updates of the plurality of updates are being written to the one or more metadata pages of the first metadata store position and written to the one or more metadata pages of the second metadata store position. A failure associated with the storage system may be identified. It may be determined that the status indicator for the transaction record for the plurality of updates is the first status indicator. It may be determined whether each metadata page of the one or more metadata pages of the first metadata store position may include a reference to the transaction record. In response to determining that each metadata page of the one or more metadata pages of the first metadata store may include a reference to the transaction record, each metadata page of the one or more metadata pages may be copied from the first metadata store position to the second metadata store position. The status indicator for the transaction record for the plurality of updates may be set to a second status indicator indicating that the one or more bulk updates of the plurality of updates are written to the second metadata store position. In response to determining that each metadata page of the one or more metadata pages of the first metadata store does not include a reference to the transaction record, each metadata page of the one or more metadata pages may be copied from the second metadata store position to the first metadata store position. The transaction record for the plurality of updates may be invalidated.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
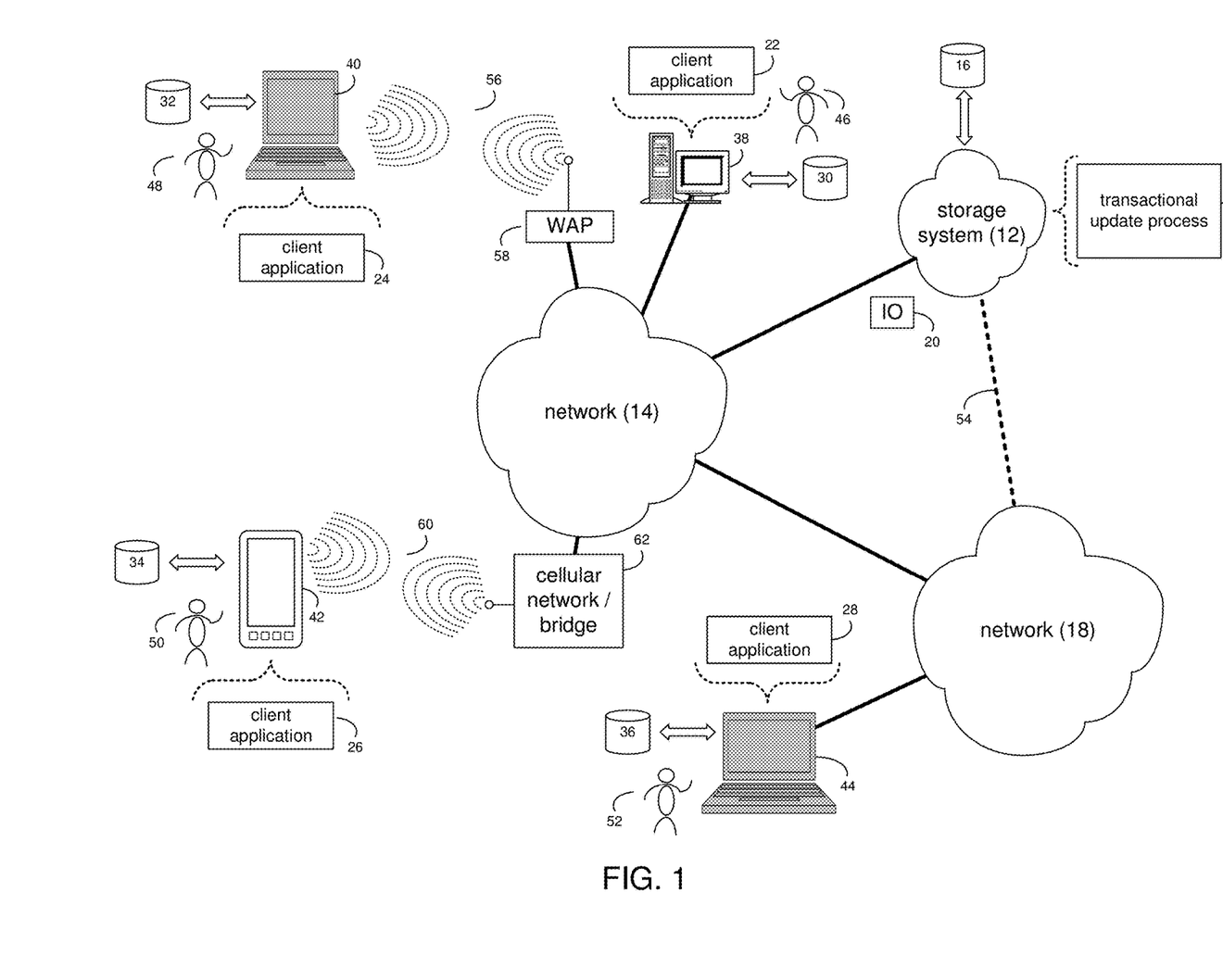
FIG. 1 is an example diagrammatic view of a storage system and a transactional update process coupled to a distributed computing network according to one or more example implementations of the disclosure.

System Overview:

Referring to FIG. 1, there is shown transactional update process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of transactional update process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of transactional update process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a transactional update process, such as transactional update process 10 of FIG. 1, may include but is not limited to, receiving a plurality of updates to one or more metadata pages of a storage system, wherein the plurality of updates include one or more bulk updates and one or more delta updates to the one or more metadata pages. A transaction record for the plurality of updates to the one or more metadata pages may be defined. The one or more delta updates may be written 404 to a non-volatile log. At least a portion of the plurality of updates may be written to the one or more metadata pages of a first metadata store position. The one or more bulk updates of the plurality of updates may be written to the one or more metadata pages of a second metadata store position in response to writing the one or more bulk updates of the plurality of updates to the one or more metadata pages of the first metadata store position. A status indicator for the transaction record for the plurality of updates may be set based upon, at least in part, writing the one or more delta updates to the non-volatile log and one or more of writing the one or more bulk updates of the plurality of updates to the one or more metadata pages of the first metadata store position and writing the one or more bulk updates of the plurality of updates to the one or more metadata pages of the second metadata store position.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
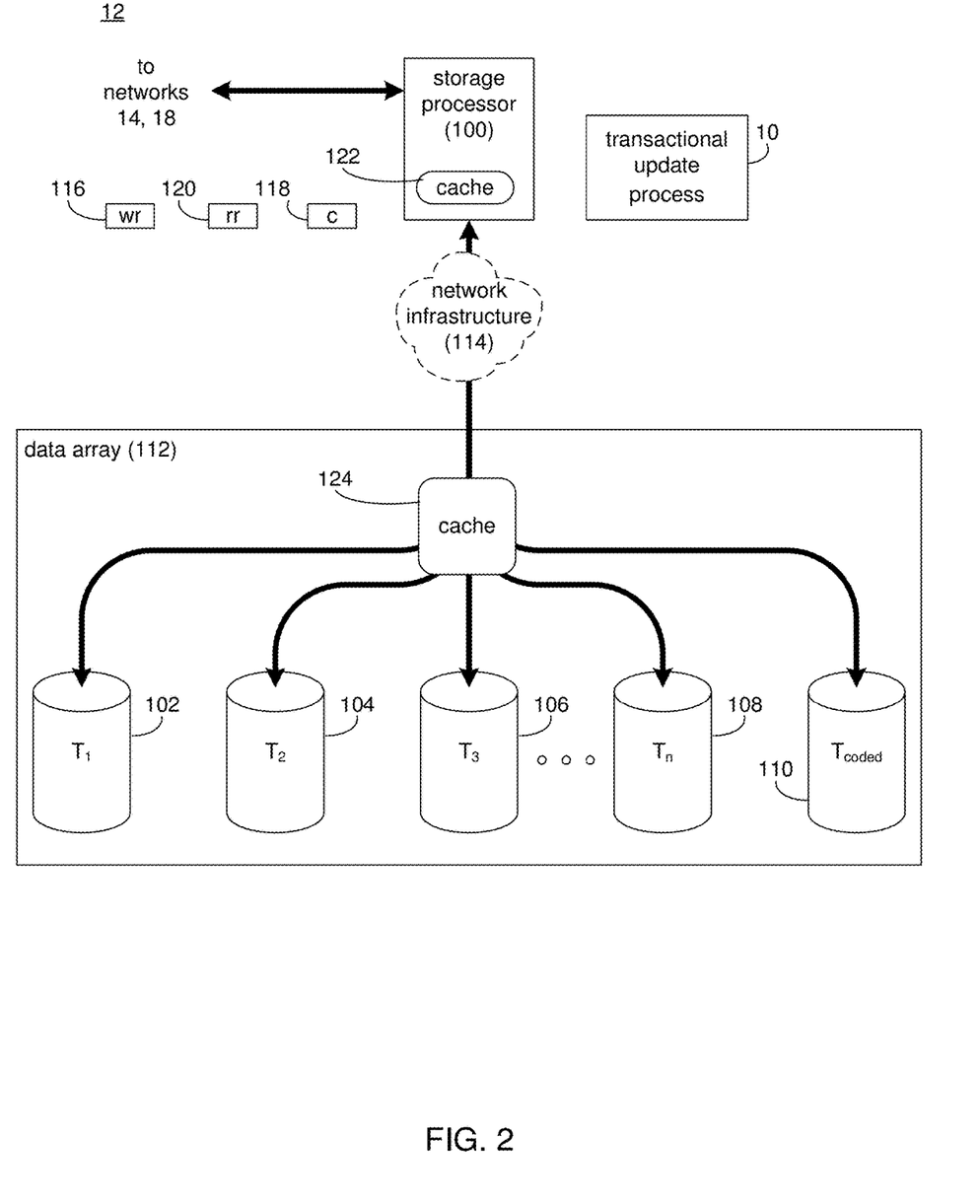
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-*n* (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability.

Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of transactional update process 10. The instruction sets and subroutines of transactional update process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of transactional update process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of transactional update process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of transactional update process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That's typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
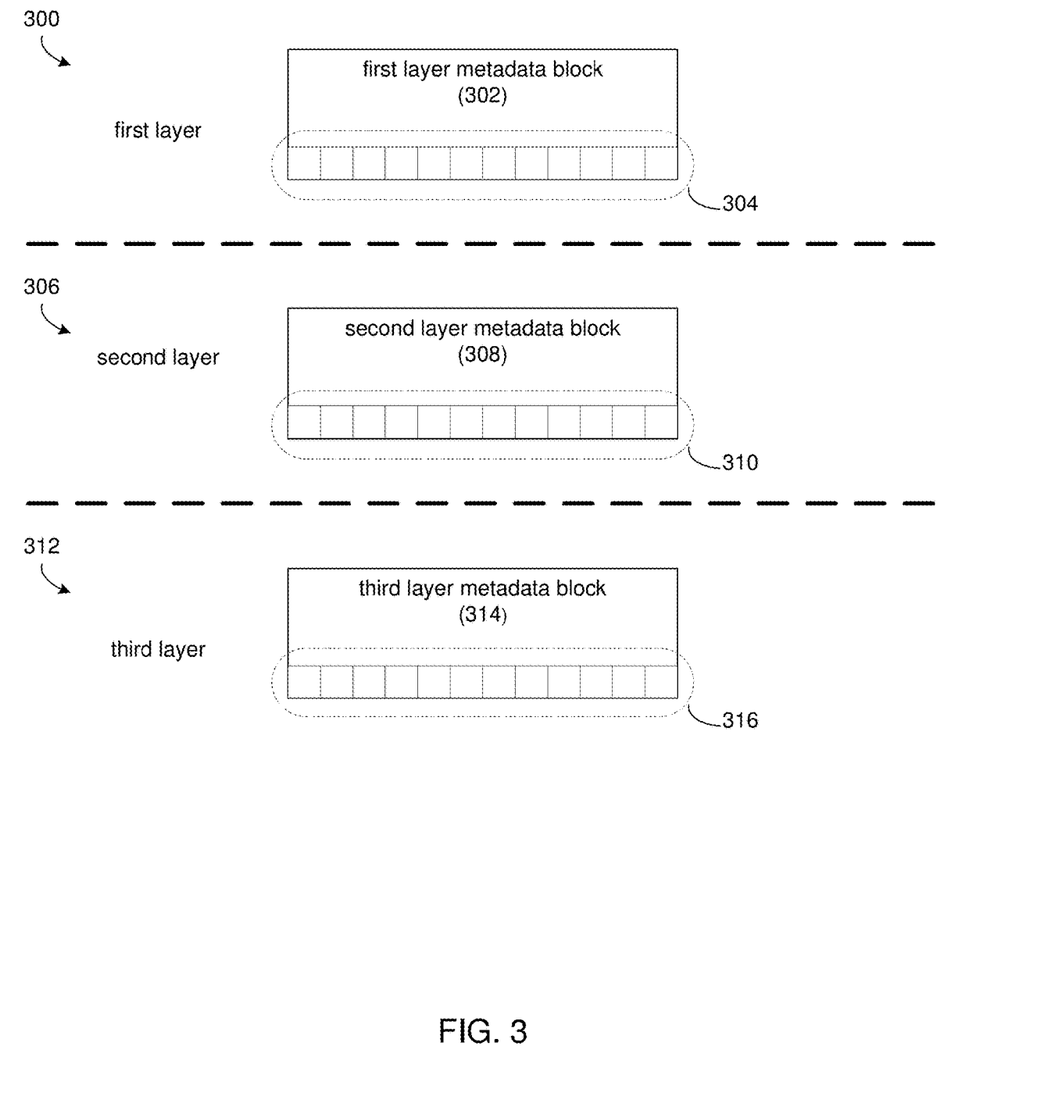
Figure 4:
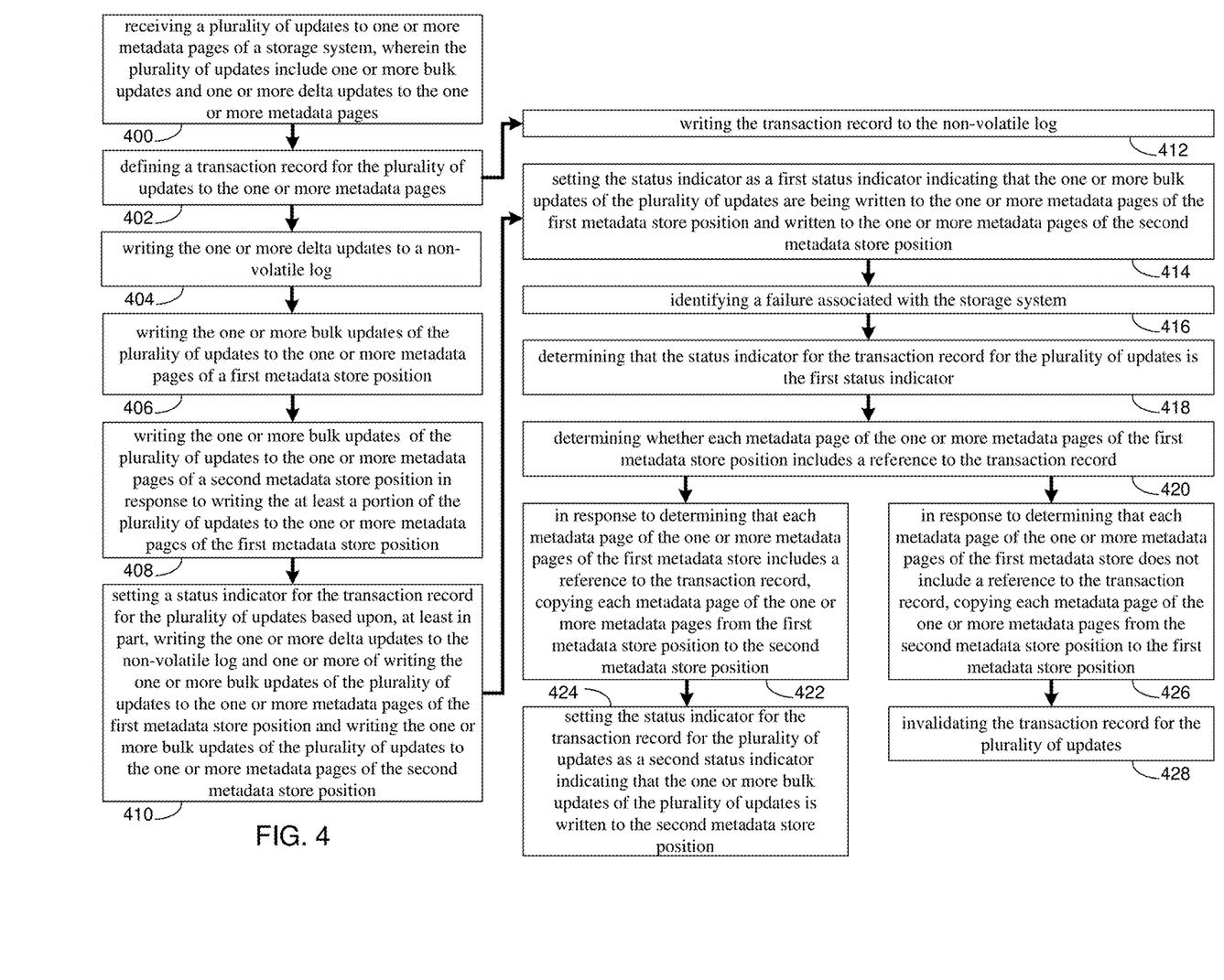
FIG. 4 is an example flowchart of the transactional update process of FIG. 1 according to one or more example implementations of the disclosure.

Referring also to FIG. 3, a storage system may generally include three layers of metadata blocks. However, it will be appreciated that various types of metadata blocks may be used within the scope of the present disclosure. While the following example includes metadata "blocks", it will be appreciated that other units of data storage may be used within the scope of the present disclosure. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer may (e.g., first layer 300) represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree"

data structure where each "leaf" of the "tree" data structure corresponds to a specific LBA range. Accordingly, each first layer metadata block (e.g., first layer metadata block 302) may hold mapping of a LBA to a second layer metadata block. It will be appreciated that other data structures may be used within the scope of the present disclosure to organize the first layer.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one.

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may have a predefined amount of storage capacity for storing metadata (e.g., user data). As will be discussed in greater detail below, third layer metadata blocks (e.g., third layer metadata block 314) may be stored in a storage array (e.g., on one of storage targets 102, 104, 106, 108 of storage array 112).

The Transactional Update Process:

Referring also to FIGS. 4-7 and in some implementations, transactional update process 10 may receive 400 a plurality of updates to one or more metadata pages of a storage system, wherein the plurality of updates include one or more bulk updates and one or more delta updates to the one or more metadata pages. A transaction record for the plurality of updates to the one or more metadata pages may be defined 402. The one or more delta updates may be written 404 to a non-volatile log. The one or more bulk updates of the plurality of updates may be written 406 to the one or more metadata pages of a first metadata store position. The one or more bulk updates of the plurality of updates may be written 408 to the one or more metadata pages of a second metadata store position in response to writing the one or more bulk updates of the plurality of updates to the one or more metadata pages of the first metadata store position. A status indicator for the transaction record for the plurality of updates may be set 410 based upon, at least in part, writing the one or more delta updates to the non-volatile log and one or more of writing the one or more bulk updates of the plurality of updates to the one or more metadata pages of the first metadata store position and writing the one or more bulk updates of the plurality of updates to the one or more metadata pages of the second metadata store position.

As will be discussed in greater detail below, implementations of the present disclosure may allow consistent transactional committing of different metadata types without requiring an intermediary journal. For example, updates to metadata pages of a storage system may include delta updates (i.e., changes to a specific portion or area of a metadata page) and bulk updates (i.e., changes to the entire metadata page). In some implementations, the difference between delta updates and bulk updates may be based upon, at least in part, a threshold amount of change. For example, changes that impact less than a threshold amount of a metadata page may be considered a delta update while changes that impact an amount of the metadata page that equals or exceeds the threshold may be considered a bulk update. In some implementations, when applying a bulk update, a new version of the metadata page may be written to a metadata store as is, while applying delta updates may include reading the old metadata page, updating the corresponding area (i.e. applying delta), and writing back. In some implementations, it may be beneficial to process these types of changes separately (e.g., to increase metadata page amortization). For example and as will be discussed in greater detail below, delta updates may be stored to a non-volatile log and bulk updates may be grouped together (i.e., as a transaction) and all written to a metadata store with the metadata pages that are to be updated. Further, the changes of each type (i.e., delta or bulk) must be preserved such that the changes can be recovered in the event of a storage system failure.

However, conventional approaches for processing these types of changes require persisting the bulk updates to large transactional areas in non-volatile random access memory (e.g., NVRAM). Accordingly, these conventional approaches reduce overall system performance. For example, conventional approaches waste NVRAM bandwidth, that is a bottleneck in many scenarios, and waste CPU and other resources for additional processing of bulk updates to the large transactional areas in NVRAM to journal the bulk updates. Further, these conventional approaches increase metadata commit latency with the processing of bulk updates on a transactional journal of NVRAM and introduce additional waiting for NVRAM write completion and scheduling cycles. Additionally, the large transactional areas waste expensive NVRAM space within a storage system. Accordingly, implementations of the present disclosure allow consistent transactional committing of different metadata update types without an intermediate transactional location in NVRAM.

In some implementations, transactional update process 10 may receive 400 a plurality of updates to one or more metadata pages of a storage system. For example, a storage system may include various metadata pages, where each metadata page may generally include a reference to a physical location of user data within a data array of the storage system. In some implementations, the plurality of updates may include one or more delta updates and one or more bulk updates received from various client electronic devices. A delta update may generally include an update to a specific portion or area of a metadata page. A bulk update may generally include an update to the entire metadata page. In this manner, transactional update process 10 may receive 400 one or delta updates to one or more metadata pages and one or more bulk updates to the one or more metadata pages.

Figure 5:
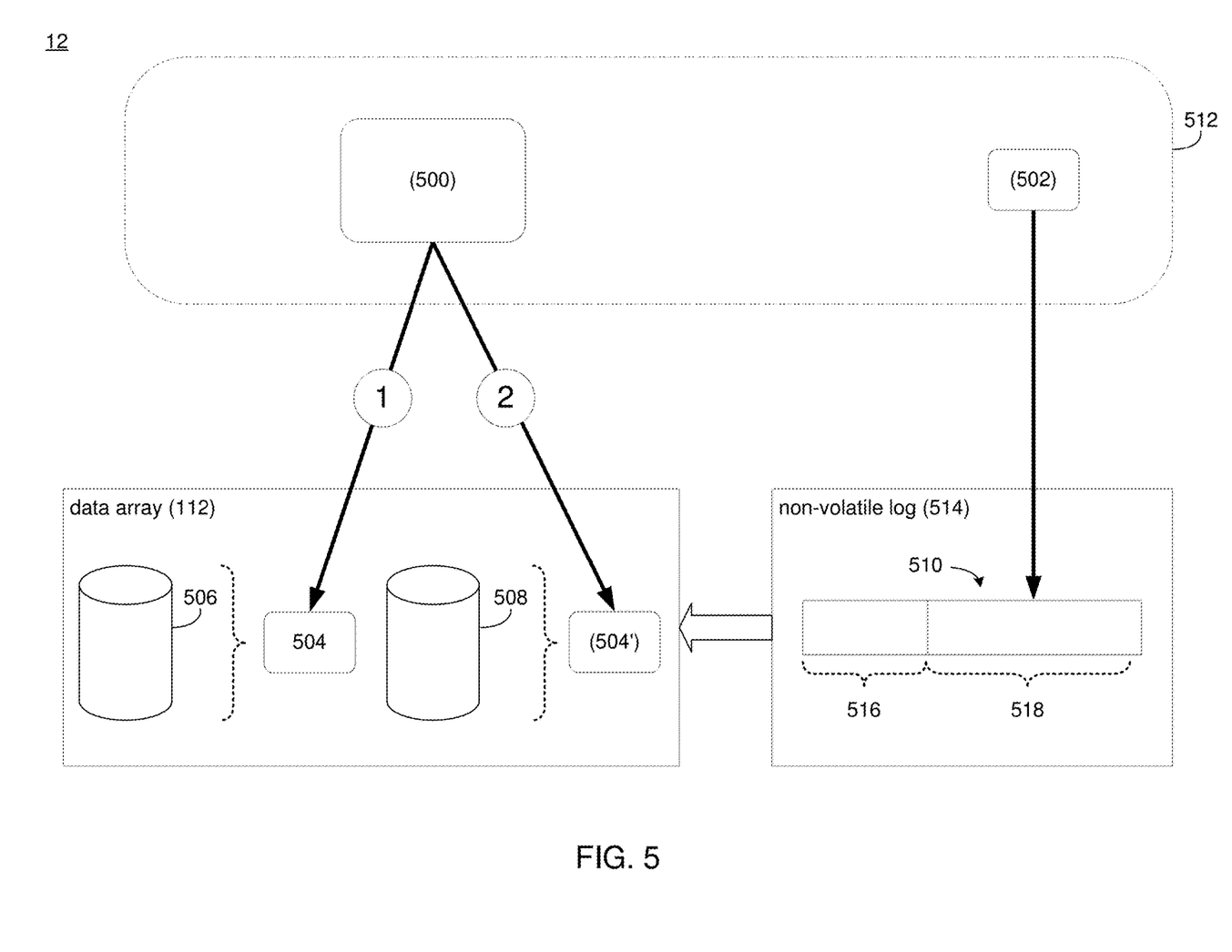
FIGS. 5-7 are example diagrammatic views of the transactional update process of FIG. 1 according to one or more example implementations of the disclosure.

Referring also to the example of FIG. 5 and in some implementations, transactional update process 10 may receive 400 a plurality of updates to one or more metadata pages of a storage system. For example, the plurality of updates may include one or more bulk updates (e.g., bulk update 500) and one or more delta updates (e.g., delta update 502). In some implementations, the plurality of updates may be received from one or more client electronic devices (e.g., client electronic devices 38, 40, 42, 44) for processing on storage system 12. In some implementations and as discussed above, the plurality of updates may include changes to one or more metadata pages (e.g., metadata page 504). As will be discussed in greater detail below, a data array (e.g., data array 12) may include a metadata store with multiple metadata store positions (e.g., first metadata store position 506 and second metadata store position 508) that are configured to store identical copies of each metadata page (e.g., metadata page 504 of first metadata store position 506 and metadata page 504' of second metadata store position 508). While an example of a single bulk update and a single delta update has been shown, it will be appreciated that any number of bulk updates and/or delta updates may be received 400 within the scope of the present disclosure.

In some implementations, transactional update process 10 may define 402 a transaction record for the plurality of updates to the one or more metadata pages. For example and as discussed above, a plurality of updates may be received 400 for one or more metadata pages that may include bulk updates and/or delta updates. As there may be significant benefits (e.g., amortization of write operations, etc.) for processing bulk updates differently than delta updates, it may be desirable to synchronize these updates as a single transaction. In other words, transactional update process 10 may allow for all updates to be completed in transaction format (i.e. with an "all or nothing" principle). In this manner and as will be discussed in greater detail below, by defining 402 the plurality of updates as a transaction, transactional update process 10 may provide a mechanism of transaction rollback/roll forward in case a transaction is incomplete because of system crash, failure, etc.

In some implementations, defining 402 the transaction record for the plurality of updates to the one or more metadata pages may include writing 412 the transaction record to a non-volatile log. along with a list of metadata page addresses for the bulk updates that are incorporated in the transaction. In some implementations, transactional update process 10 may write the list of metadata page addresses for the bulk updates on the transaction record "header". Thus, the non-volatile log transaction records may include a full set of deltas and a full set of references to the bulk pages of a particular transaction.

Referring again to the example of FIG. 5 and in some implementations, transactional update process 10 may define 402 a transaction record (e.g., transaction record 510) for a transaction including the plurality of updates to the one or more metadata pages (e.g., transaction 512). For example, transactional update process 10 may define 402 the transaction record for transaction 512 by writing 412 transaction record 510 in non-volatile log 514. In some implementations, transactional update process 10 may write the metadata page addresses for the one or more bulk updates (e.g., bulk update 500) to the header (e.g., header 516) of transaction record 510.

In some implementations, transactional update process 10 may write 404 delta updates a non-volatile log. For example, transactional update process 10 may write the one or more delta updates as a payload to a transaction record. In some implementations, the one or more deltas may be added to the non-volatile log for a future amortized de-stage to the metadata store. As will be discussed in greater detail below, transactional update process 10 may allow for updates to be guaranteed to be coherent by storing the delta updates and the references to the bulk updates as a transaction. Referring again to the example of FIG. 5 and in some implementations, transactional update process 10 may write 404 (e.g., delta update 502) as a payload (e.g., payload 518) of transaction record 510.

In some implementations, transactional update process 10 may write 406 the one or more bulk updates of the plurality of updates to the one or more metadata pages of a first metadata store position. For example, transactional update process 10 may write the one or more bulk updates of the plurality of updates to the metadata store in a serialized order. In some implementations, transactional update process 10 may write 406 the one or more bulk updates to the first metadata store position. In some implementations where the one or more bulk updates the plurality of updates includes multiple bulk updates, transactional update process 10 may write 406 these bulk updates to the first metadata store position in parallel.

Referring again to the example of FIG. 5 and in some implementations, transactional update process 10 may write 406 the one or more bulk updates of the plurality of updates to the one or more metadata pages (e.g., bulk update 500) to the first metadata store position (e.g., first metadata store position 506). As shown in FIG. 5, the writing 406 of bulk update 500 may be in a serial order (represented by the "1" on the arrow between bulk update 500 and first metadata page 504).

In some implementations, each of the first metadata store position and the second metadata store position may be storage devices configured to mirror each other. For example, the first metadata store position and the second metadata store position may be configured to form a "mirror" RAID type. In this manner, complete copies of each metadata page may be stored on at least two different storage devices. In some implementations, each of the first metadata store position and the second metadata store position may support page atomicity (e.g., for 4 kilobyte pages). In other words, when a write to a metadata store position is not completed (e.g., because of crash, failure, or any other reason), it is guaranteed that the target address within the metadata store position will contain either a "new" or an "old" variant of a metadata page, but never garbage. While an example has been provided with a single mirror (i.e., two storage devices with two copies of each metadata page), it will be appreciated that any number of storage devices may be used to mirror the one or more metadata pages of the storage system within the scope of the present disclosure.

In some implementations, transactional update process 10 may write 408 the one or more bulk updates the plurality of updates to the one or more metadata pages of a second metadata store position in response to writing 406 the one or more bulk updates the plurality of updates to the one or more metadata pages of the first metadata store position. For example, transactional update process 10 may, when all writes 406 to the first metadata store position have been successfully completed, write 408 the one or more bulk updates the plurality of updates of the one or more metadata pages to the second metadata store position. Accordingly, transactional update process 10 may guarantee that if the transaction is not completed because of any type of failure, the metadata store may include at least one fully consistent set of all metadata pages (e.g., either "new" or "old").

Referring again to the example of FIG. 5 and in some implementations, transactional update process 10 may write 408 the one or more bulk updates the plurality of updates to the one or more metadata pages (e.g., bulk update 500) to the second metadata store position (e.g., second metadata store position 508) in response to writing 406 the one or more bulk updates the plurality of updates to the one or more metadata pages of the first metadata store position (e.g., first metadata store position 506). As shown in FIG. 5, the writing 408 of bulk update 500 to metadata page 504' of second metadata store position 508 may begin following the writing 406 of bulk update 500 to metadata page 504 of first metadata store position 506 (represented by the "2" on the arrow between bulk update 400 and second metadata page 504'). In this example, transactional update process 10 may ensure a consistent metadata page 504, either an old version (i.e., previous to bulk update 500) or a new version (i.e., after bulk update 500).

In some implementations, transactional update process 10 may set 410 a status indicator for the transaction record for the plurality of updates based upon, at least in part, writing 404 the one or more delta updates to the non-volatile log and one or more of writing 406 the one or more bulk updates the plurality of updates to the one or more metadata pages of the first metadata store position and writing 408 the one or more bulk updates the plurality of updates to the one or more metadata pages of the second metadata store position. For example, the status indicator may generally include a flag or status associated with the writing of the one or more bulk updates to the metadata store (e.g., either writing 406 to the first metadata store position or writing 408 to the second metadata store position). In some implementations, the status indicator may be written to the transaction record header.

In some implementations, setting 410 the status indicator for the transaction record for the plurality of updates may include setting 414 the status indicator to a first status indicator indicating that the one or more bulk updates the plurality of updates is being written to the one or more metadata pages of the first metadata store position and written to the one or more metadata pages of the second metadata store position. For example, the first status indicator (e.g., "InProgress") may be set 414 by transactional update process 10 for the transaction record while the one or more bulk updates the plurality of updates to the one or more metadata pages are being written 406 to the first metadata store position and/or while the one or more bulk updates the plurality of updates to the one or more metadata pages are being written 408 to the second metadata store position. In some implementations, the first status indicator may indicate that the one or more bulk updates the plurality of updates is being written to the one or more metadata pages of the first metadata store position and written to the one or more metadata pages of the second metadata store position. In some implementations, transactional update process 10 may set 414 the status indicator to the first status indicator in the transaction record header to indicate that the transaction is incomplete.

Referring again to the example of FIG. 5 and in some implementations, transactional update process 10 may set 414 the status indicator to the first status indicator (e.g., "InProgress") in transaction record header 518 of transaction record 510. In this example, transactional update process 10 may maintain this status indicator until the one or more bulk updates the plurality of updates (e.g., bulk update 500) is written 406 to first metadata store position 506 and written 408 to the second metadata store position 508.

In some implementations, transactional update process 10 may set the status indicator to a second status indicator in response to writing the one or more bulk updates the plurality of updates to the second metadata store position. For example and as discussed above, each of the first metadata store position and the second metadata store position may be configured to ensure that the metadata pages stored on either store position are either "old" or "new". In this manner, transactional update process 10 may set the status indicator to the second status indicator (e.g., "Completed") to indicate that the transaction has completed.

Referring again to FIG. 5 and continuing with the above example, suppose transactional update process 10 successfully writes 406 bulk update 500 to first metadata store position 506 and writes 408 bulk update 500 to second metadata store position 508. Transactional update process 10 may determine that the transaction (e.g., transaction 510) is complete as bulk update 500 and delta update 502 are persisted to memory (e.g., in data array 112 or non-volatile log 514). Accordingly, transactional update process 10 may set the status indicator of transaction record 510 to the second status indicator (e.g., "Complete").

In some implementations, transactional update process 10 may identify 416 a failure associated with the storage system. For example, at any time during the processing of the plurality of updates to the one or more metadata pages, a portion of the storage system may fail and may interrupt the writing of the one or more bulk updates the plurality of updates to the metadata store (e.g., the first metadata store position or the second metadata store position). In some implementations and in response to identifying 416 a failure associated with the storage system, transactional update process 10 may utilize the status indicator of a particular transaction record to determine the status of the plurality of updates received by the storage system at the time of the identified failure.

In one example, transactional update process 10 may determine that the status indicator is the second status indicator (e.g., "Completed"). In this example, the second status indicator may indicate that the transaction has successfully completed. Accordingly, no action may be taken in response to identifying 514 the failure associated with the storage system when the status indicator is the second status indicator. In another example, transactional update process 10 may determine that the transaction record is "torn" (i.e. does not contain a valid header, footer, etc.). In this example, transactional update process 10 may ignore this transaction record. This torn transaction record may indicate that the failure occurred before any updates are written to the metadata store (e.g., the first metadata store position).

In some implementations, transactional update process 10 may determine 418 that the status indicator for the transaction record for the plurality of updates is the first status indicator. For example, transactional update process 10 may determine that the transaction record is consistent and may determine 418 that the status indicator is the first status indicator (e.g., "InProgress"). In this example, the first status indicator may indicate that the failure occurred while writing 406 the one or more bulk updates the plurality of updates to the first metadata store position or while writing 408 the one or more bulk updates the plurality of updates to the second metadata store position.

In some implementations and in response to determining 418 that the status indicator for the transaction record for the plurality of updates is the first status indicator, transactional update process 10 may determine 420 whether each metadata page of the one or more metadata pages of the first metadata store position includes a reference to the transaction record. For example, transactional update process 10 may read references to all bulk updates within the transaction record. Transactional update process 10 may read all the corresponding bulk updates from the first metadata store position. In some implementations, transactional update process 10 may determine 420 whether each metadata page of the one or more metadata pages of the first metadata store position includes a reference to the transaction record. For example, transactional update process 10 may determine whether each metadata page that was updated is "new" by determining whether the metadata page includes a reference to a transaction ID inside the transaction record header.

In some implementations and in response to determining that each metadata page of the one or more metadata pages of the first metadata store includes a reference to the transaction record, transactional update process 10 may copy 422 each metadata page of the one or more metadata pages from the first metadata store position to the second metadata store position. For example, if each metadata page includes a reference to a transaction ID inside the transaction record header, transactional update process 10 may determine that the writing 406 of the one or more bulk updates the plurality of updates to the first metadata store position has completed successfully and that the failure occurred during the writing of the one or more bulk updates the plurality of updates to the second metadata store position. In this example, transactional update process 10 may perform a "roll forward" by copying 422 the metadata pages from the first metadata store position to the second metadata store position. In this manner, transactional update process 10 may guarantee that the metadata store is consistent and contains "new" metadata pages on each metadata store position.

In some implementations, transactional update process 10 may set 424 the status indicator to the second status indicator indicating that the one or more bulk updates the plurality of updates is written to the second metadata store position. For example, in response to copying 422 the metadata pages from the first metadata store position to the second metadata store position, transactional update process 10 may complete the transaction by ensuring that each position of the metadata store includes the same, updated metadata pages. Accordingly, transactional update process 10 may set 424 the status indicator of the transaction record to the second status indicator (e.g., "Complete"). In this manner, the transaction may be completed and consistent.

Figure 6:
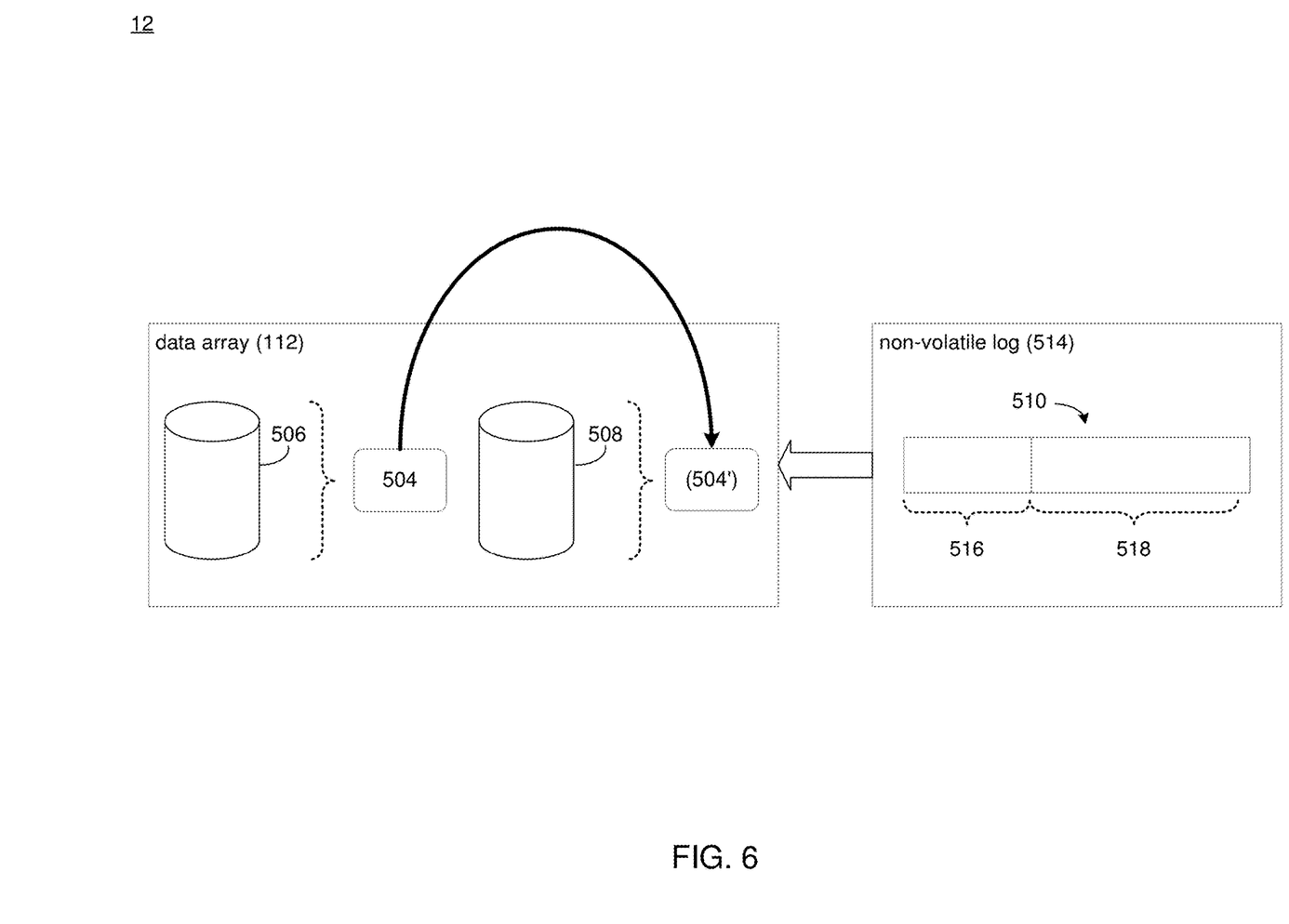

Referring also to the example of FIG. 6 and in some implementations, transactional update process 10 may determine 418 that the status indicator for transaction record 510 is the first status indicator (e.g., "InProgress"). In some implementations, transactional update process 10 may determine 420 whether each metadata page of the one or more metadata pages of the first metadata store position includes a reference to the transaction record by reading each metadata page of the first metadata store position. In this example, transactional update process 10 may read each metadata page (e.g., metadata page 504) from first metadata store position 506 and determine whether metadata page 504 includes a reference to transaction record 510. Suppose that transactional update process 10 determines 420 that metadata page 504 does include a reference to transaction record 510. In this example, transactional update process 10 may copy 422 metadata page 504 from first metadata store position 506 to second metadata store position 508. In this manner, the updated copy of the metadata page (e.g., metadata page 504) may be persisted on each metadata store position and the transaction may be complete. Transactional update process 10 may set 424 the status indicator of transaction record 510 to be the second status indicator (e.g., "Complete").

In some implementations and in response to determining that each metadata page of the one or more metadata pages of the first metadata store does not include a reference to the transaction record, transactional update process 10 may copy 426 each metadata page of the one or more metadata pages from the second metadata store position to the first metadata store position. For example, if some (e.g., at least one) metadata pages do not include a reference to a transaction ID inside the transaction record header, transactional update process 10 may determine that some (e.g., at least one) of the metadata pages are "old" and that the failure during the writing 406 of the one or more bulk updates the plurality of updates to the first metadata store position. In this example, transactional update process 10 may perform a "rollback" by copying each metadata page from the second metadata store position to the first metadata store position. In this manner, transactional update process 10 may guarantee that the metadata store is consistent and contains "old" metadata pages on each metadata store position.

In some implementations, transactional update process 10 may invalidate 428 the transaction record for the plurality of updates. For example, in response to copying 426 the metadata pages from the first metadata store position to the second metadata store position, transactional update process 10 may invalidate 428 the transaction record by rewriting the header with zeroes, or any other way. At this point, the transaction may be completely rolled back to the "old" metadata page.

Figure 7:
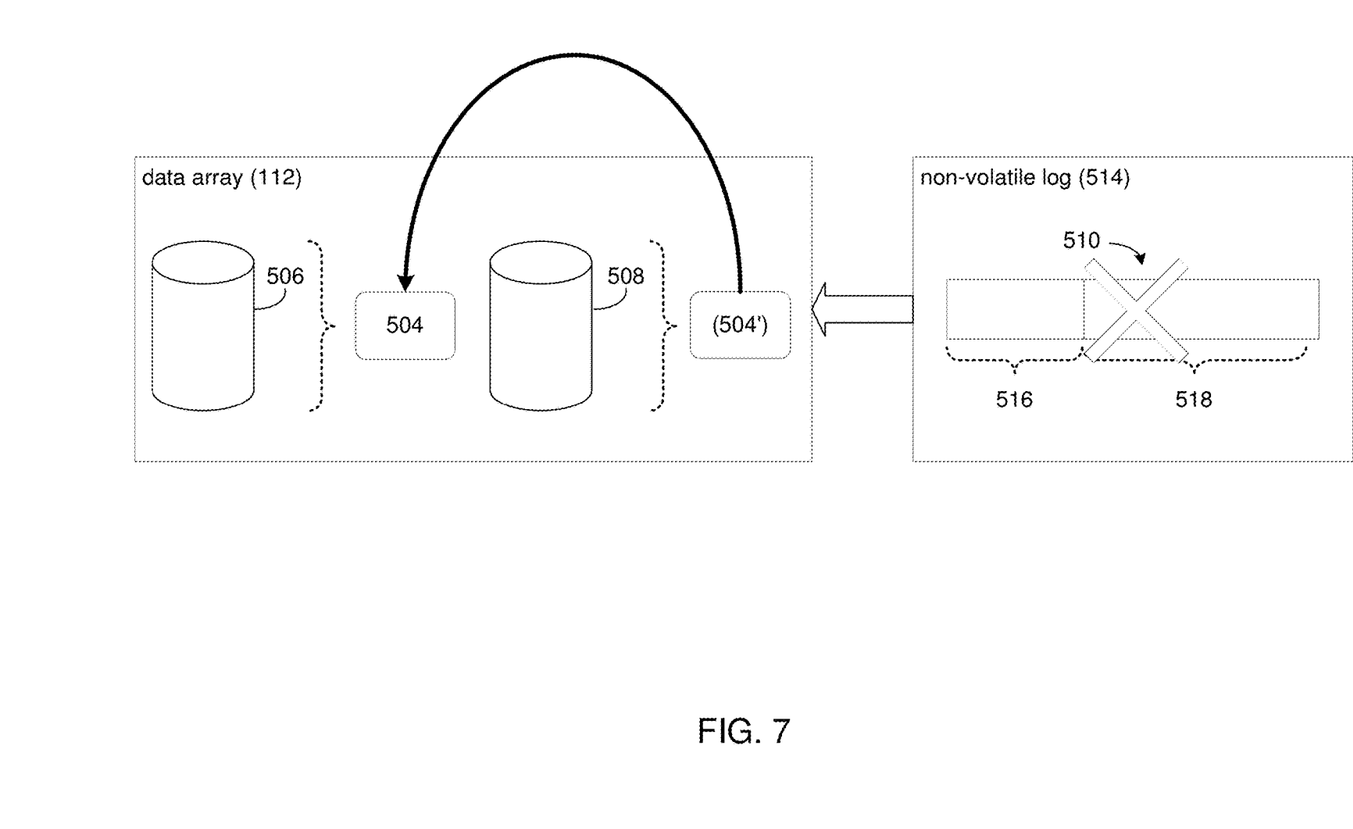

Referring also to the example of FIG. 7 and in some implementations, transactional update process 10 may determine 418 that the status indicator for transaction record 510 is the first status indicator (e.g., "InProgress"). In some implementations, transactional update process 10 may determine 420 whether each metadata page of the one or more metadata pages of the first metadata store position includes a reference to the transaction record by reading each metadata page of the first metadata store position. In this example, transactional update process 10 may read each metadata page (e.g., metadata page 504) from first metadata store position 506 and determine whether metadata page 504 includes a reference to transaction record 510. Suppose that transactional update process 10 determines 420 that metadata page 504 does not include a reference to transaction record 510. In this example, transactional update process 10 may copy 426 metadata page 504' from second metadata store position 508 to first metadata store position 506. In this manner, the "old" copy of the metadata page (e.g., metadata page 504') may be persisted on each metadata store position to roll back the metadata page to its state prior to receiving the plurality of updates. Transactional update process 10 may invalidate 428 transaction record 510. Accordingly, transactional update process 10 may guarantee that the metadata store is consistent and contains "old" metadata pages on both positions (e.g., first metadata store position 506 and second metadata store position 508).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:

receiving a plurality of updates to one or more metadata pages of a storage system, wherein the plurality of updates include one or more bulk updates and one or more delta updates to the one or more metadata pages;

defining a transaction record for the plurality of updates to the one or more metadata pages;

writing the one or more delta updates to a non-volatile log;

writing the one or more bulk updates of the plurality of updates to the one or more metadata pages of a first metadata store position;

writing the one or more bulk updates of the plurality of updates to the one or more metadata pages of a second metadata store position in response to writing the one or more bulk updates of the plurality of updates to the one or more metadata pages of the first metadata store position; and setting a status indicator for the transaction record for the plurality of updates based upon, at least in part, writing the one or more delta updates to the non-volatile log and one or more of writing the one or more bulk updates of the plurality of updates to the one or more metadata pages of the first metadata store position and writing the one or more bulk updates of the plurality of updates to the one or more metadata pages of the second metadata store position.

2. The computer-implemented method of claim 1, wherein each of the first metadata store position and the second metadata store position are storage devices configured to mirror each other.

3. The computer-implemented method of claim 1, wherein defining the transaction record for the plurality of updates to the one or more metadata pages includes writing the transaction record to the non-volatile log.

4. The computer-implemented method of claim 1, wherein setting the status indicator for the transaction record for the plurality of updates includes setting the status indicator to a first status indicator indicating that the one or more bulk updates of the plurality of updates are being written to the one or more metadata pages of the first metadata store position and written to the one or more metadata pages of the second metadata store position.

5. The computer-implemented method of claim 4, further comprising:
identifying a failure associated with the storage system;
determining that the status indicator for the transaction record for the plurality of updates is the first status indicator; and
determining whether each metadata page of the one or more metadata pages of the first metadata store position includes a reference to the transaction record.

6. The computer-implemented method of claim 5, further comprising:
in response to determining that each metadata page of the one or more metadata pages of the first metadata store includes a reference to the transaction record, copying each metadata page of the one or more metadata pages from the first metadata store position to the second metadata store position; and
setting the status indicator for the transaction record for the plurality of updates to a second status indicator indicating that the one or more bulk updates of the plurality of updates are written to the second metadata store position.

7. The computer-implemented method of claim 5, further comprising:

in response to determining that each metadata page of the one or more metadata pages of the first metadata store does not include a reference to the transaction record, copying each metadata page of the one or more metadata pages from the second metadata store position to the first metadata store position; and
invalidating the transaction record for the plurality of updates.

8. A computer program product residing on a non-transitory computer readable medium having a plurality of instructions stored thereon which, when executed by a processor, cause the processor to perform operations comprising:

receiving a plurality of updates to one or more metadata pages of a storage system, wherein the plurality of updates include one or more bulk updates and one or more delta updates to the one or more metadata pages;

defining a transaction record for the plurality of updates to the one or more metadata pages;

writing the one or more delta updates to a non-volatile log;

writing the one or more bulk updates of the plurality of updates to the one or more metadata pages of a first metadata store position;

writing the one or more bulk updates the plurality of updates to the one or more metadata pages of a second metadata store position in response to writing the one or more bulk updates the plurality of updates to the one or more metadata pages of the first metadata store position; and setting a status indicator for the transaction record for the plurality of updates based upon, at least in part, writing the one or more delta updates to the non-volatile log and one or more of writing the one or more bulk updates the plurality of updates to the one or more metadata pages of the first metadata store position and writing the one or more bulk updates the plurality of updates to the one or more metadata pages of the second metadata store position.

9. The computer program product of claim 8, wherein each of the first metadata store position and the second metadata store position are storage devices configured to mirror each other.

10. The computer program product of claim 8, wherein defining the transaction record for the plurality of updates to the one or more metadata pages includes writing the transaction record to the non-volatile log.

11. The computer program product of claim 8, wherein setting the status indicator for the transaction record for the plurality of updates includes setting the status indicator to a first status indicator indicating that the one or more bulk updates the plurality of updates is being written to the one or more metadata pages of the first metadata store position and written to the one or more metadata pages of the second metadata store position.

12. The computer program product of claim 11, wherein the operations further comprise:
identifying a failure associated with the storage system;
determining that the status indicator for the transaction record for the plurality of updates is the first status indicator; and
determining whether each metadata page of the one or more metadata pages of the first metadata store position includes a reference to the transaction record.

13. The computer program product of claim 12, wherein the operations further comprise:

in response to determining that each metadata page of the one or more metadata pages of the first metadata store includes a reference to the transaction record, copying each metadata page of the one or more metadata pages from the first metadata store position to the second metadata store position; and setting the status indicator for the transaction record for the plurality of updates to a second status indicator indicating that the one or more bulk updates the plurality of updates is written to the second metadata store position.

14. The computer program product of claim 12, wherein the operations further comprise:

in response to determining that each metadata page of the one or more metadata pages of the first metadata store does not include a reference to the transaction record, copying each metadata page of the one or more metadata pages from the second metadata store position to the first metadata store position; and invalidating the transaction record for the plurality of updates.

15. A computing system comprising:

a memory; and a processor configured to receive a plurality of updates to one or more metadata pages of a storage system, wherein the plurality of updates include one or more bulk updates and one or more delta updates to the one or more metadata pages, wherein the processor is further configured to define a transaction record for the plurality of updates to the one or more metadata pages, wherein the processor is further configured to write the one or more delta updates to a non-volatile log, wherein the processor is further configured to write at least a portion of the plurality of updates to the one or more metadata pages of a first metadata store position, wherein the processor is further configured to write the one or more bulk updates the plurality of updates to the one or more metadata pages of a second metadata store position in response to writing the one or more bulk updates the plurality of updates to the one or more metadata pages of the first metadata store position, and wherein the processor is further configured to set a status indicator for the transaction record for the plurality of updates based upon, at least in part, writing the one or more delta updates to the non-volatile log and one or more of writing the one or more bulk updates the plurality of updates to the one or more metadata pages of the first metadata store position and writing the one or more bulk updates the plurality of updates to the one or more metadata pages of the second metadata store position.

16. The computing system of claim 15, wherein each of the first metadata store position and the second metadata store position are storage devices configured to mirror each other.

17. The computing system of claim 15, wherein defining the transaction record for the plurality of updates to the one or more metadata pages includes writing the transaction record to the non-volatile log.

18. The computing system of claim 15, wherein setting the status indicator for the transaction record for the plurality of updates includes setting the status indicator to a first status indicator indicating that the one or more bulk updates the plurality of updates is being written to the one or more metadata pages of the first metadata store position and written to the one or more metadata pages of the second metadata store position.

19. The computing system of claim 18, wherein the processor is further configured to:

identify a failure associated with the storage system;

determine that the status indicator for the transaction record for the plurality of updates is the first status indicator; and determine whether each metadata page of the one or more metadata pages of the first metadata store position includes a reference to the transaction record.

20. The computing system of claim 19, wherein the processor is further configured to:

in response to determining that each metadata page of the one or more metadata pages of the first metadata store includes a reference to the transaction record, copy each metadata page of the one or more metadata pages from the first metadata store position to the second metadata store position; and set the status indicator for the transaction record for the plurality of updates to a second status indicator indicating that the one or more bulk updates the plurality of updates is written to the second metadata store position.

* * * * *